April 10, 1956     J. H. LEE     2,741,691
RADIANT ENERGY SOURCE FOR INFRARED
SPECTROSCOPY AND THE LIKE
Filed Feb. 18, 1952
*Fig. 1*
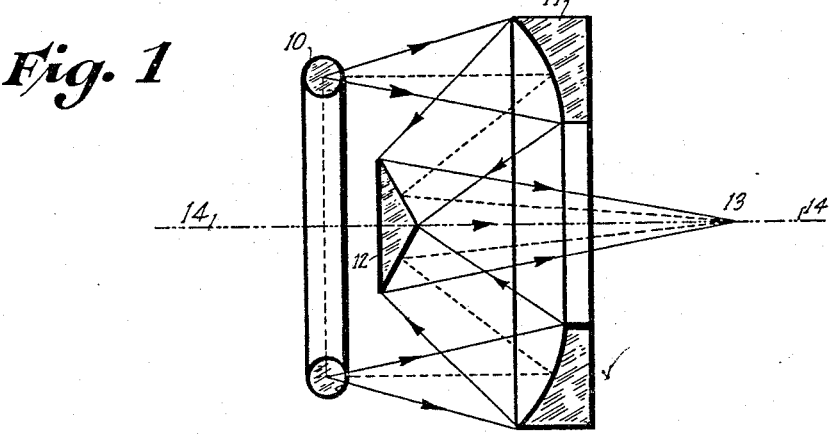
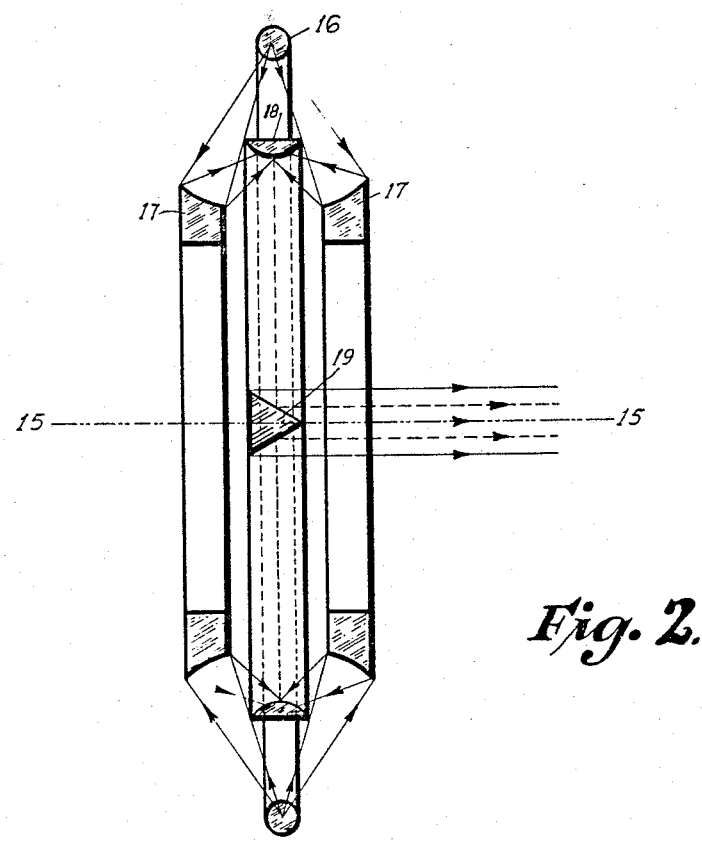
*Fig. 2.*
INVENTOR.
JAMES H. LEE
BY
ATTORNEY United States Patent Office 2,741,691
Patented Apr. 10, 1956

2,741,691
RADIANT ENERGY SOURCE FOR INFRARED SPECTROSCOPY AND THE LIKE

James H. Lee, Beaumont, Tex., assignor to Socony Mobil Oil Company, Inc., a corporation of New York Application February 18, 1952, Serial No. 272,191

1 Claim. (Cl. 219—34)

This invention has to do with radiant energy sources for infrared spectroscopy and the like.

Infrared radiation sources for spectrophotometers and the like usually have been confined to rod-shaped glowing bodies or point sources, such as the Nernst glower, globar rods, tungsten sources, and the like. Use of the carbon arc has also been suggested. Usually, such sources are relatively small in size and the radiant power available from them is limited. Aberrations rising from the geometry of the source frequently limit the resolving power of the instrument. For example, with globar element sources, such aberrations limit the length of spectrometer slits and hence, the length of the glower.

This invention has for its object the provision of radiant energy source elements of comparatively greater size, together with an optical system whereby the radiant energy from such elements can be properly concentrated into a beam useful for the purposes under discussion.

It is based upon the provision of a radiant energy source substantially toroidal in form, together with a plurality of mirror elements assembled co-axially with said toroidal source and concentrating energy therefrom into a concentrated beam emergent from the system on the axis of the toroidal source.

In order to more readily understand this invention, reference is now made to the drawings forming a part of this specification. In these drawings, Figure 1 shows a simple form of the arrangement giving a point concentrated beam, and Figure 2 shows another arrangement giving a parallel ray beam.

Referring to Figure 1, which shows, in diagram form, a sectional view taken at the axis of a source assembly, 10 indicates a source of radiant energy, such as, for example, a globar bent into a circular form. While the cross-section of the globar itself, as here shown, is usually circular, it need not be so, and the radiant source indicated at 10 need not be a glowing solid rod, since it could be a coil of Nichrome wire, or a single resistance wire, or any other material suitable for giving the desired radiation. And it need not be arranged to cover the full 360° of the torus circle, since connections and the like will usually occupy some portions of the circle. Because of these things, I have chosen herein to refer to the configuration of the radiant energy source as substantially toroidal.

Radiant energy emitted from 10 is collected upon concave mirror 11, which is mounted coaxially with source 10 and reflected to mirror 12, also coaxially mounted. Mirror 12, in this case is conical, resulting in a point-concentrated beam of radiant energy, the axis of which beam is the axis of the radiant energy source. This beam will be focused upon point 13. It will be obvious to those skilled in the art that by control of the shape and position of the mirrors 11 and 12 different forms of the beam may be gotten. For example, with a mirror of proper surface curvature at 13, properly positioned, as known to those skilled in the optical art, the beam along system axis 14—14 could be a parallel ray-beam.

It will be further obvious to those familiar with the principles of optical engineering that a suitable mirror surface can be imposed coaxially between the source 10 and the concave mirror 11 so that the diameter of 10 can be increased thereby increasing the radiant energy available.

Figure 2 shows a different form of system, applicable to radiant energy sources of considerable size. In this figure the system is again shown diagrammatically in a section taken along the axis 15—15 of the toroidal radiant energy source 16. Here the reflecting system is not only coaxially aligned with the toroidal source, but is also concentrically aligned. The mirror system consists of paired primary mirrors 17,17, shown as ground into the external surface of each of two rings, together with secondary mirror 18, also in ring form, and having a curved surface, and conical mirror 19. This system results in a parallel-ray beam directed along the axis of the toroidal radiant energy source. It will be obvious that by proper shaping of mirror 19, this beam could also be focused to a point concentration, or a supplementary lens system could be used for the same purpose.

It will be noted that the radiant energy source system here shown has several advantages. Principally it offers a radiant energy source capable of high energy flux and relatively free of first-order aberrations arising from geometry of the source. Second, the ratio of energy concentration is rather high, permitting operation of source at lower operating temperatures. This will permit longer operating life, or less expensive source materials.

I claim:

A source system of radiant energy for use in infrared spectroscopy comprising a toroidal source of radiant energy, an annular concave mirror arranged coaxially with and relatively near to said toroidal source, said annular concave mirror having an outside diameter greater than the outside diameter of said toroidal source and an inside diameter less than the inside diameter of said toroidal source, and a conical mirror arranged with its axis coincident with the axes of said toroidal source and said annular concave mirror and positioned spaced between said toroidal source and said annular concave mirror, said conical mirror having a diameter less than the inner diameter of said annular concave mirror, the radiant energy emitted from said toroidal source being transmitted to said annular concave mirror and reflected back toward said toroidal source to said conical mirror from whence it is reflected away from said toroidal source through said annular concave mirror as a point-concentrated beam of radiant energy.

References Cited in the file of this patent

UNITED STATES PATENTS

| | | |
|---|---|---|
| 2,216,993 | Wedel | Oct. 8, 1940 |
| 2,555,327 | Elliott | June 5, 1951 |
| 2,560,652 | Landauer | July 17, 1951 |

FOREIGN PATENTS

| | | |
|---|---|---|
| 3,058 | Great Britain | Feb. 9, 1903 |
| 29,282 | Great Britain | Dec. 14, 1909 |